July 1, 1969
D. L. BIANCHETTA
3,452,519
PRESSURE STABILIZING VENT SYSTEM FOR HYDRAULIC
CIRCUIT FLUID RESERVOIRS
Filed Feb. 6, 1967
Sheet 1 of 2
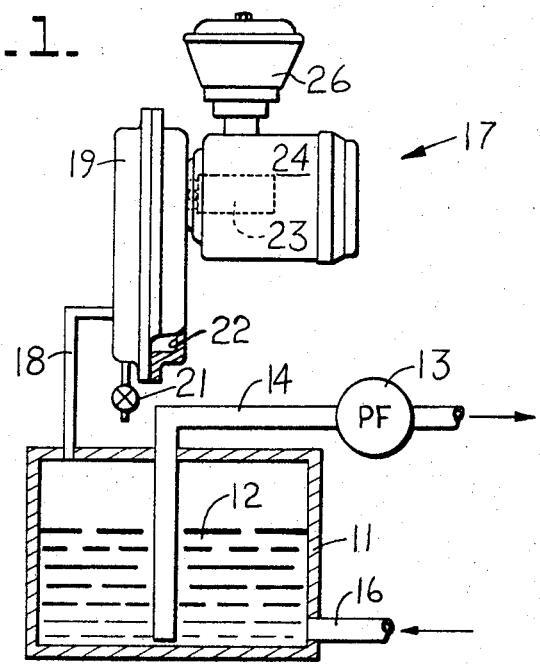
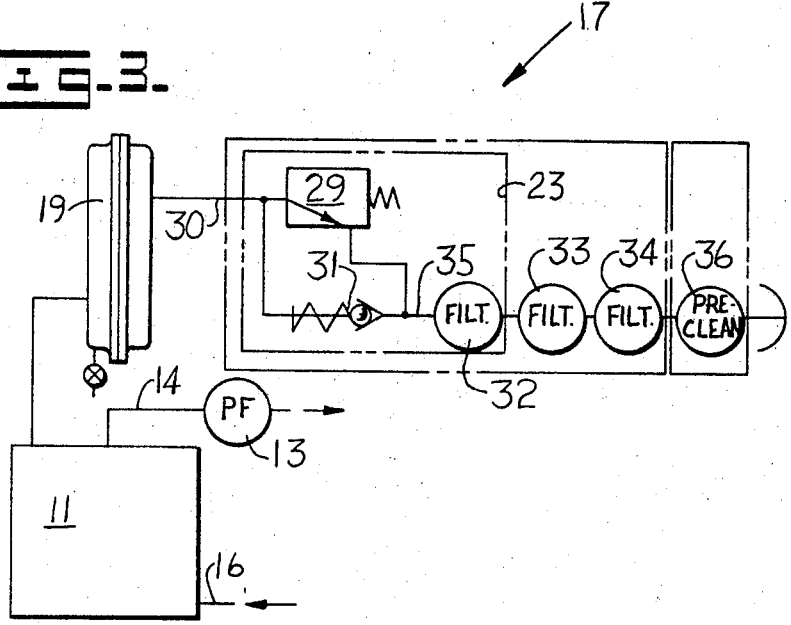
INVENTOR.
Donald L. Bianchetta
BY
ATTORNEYS

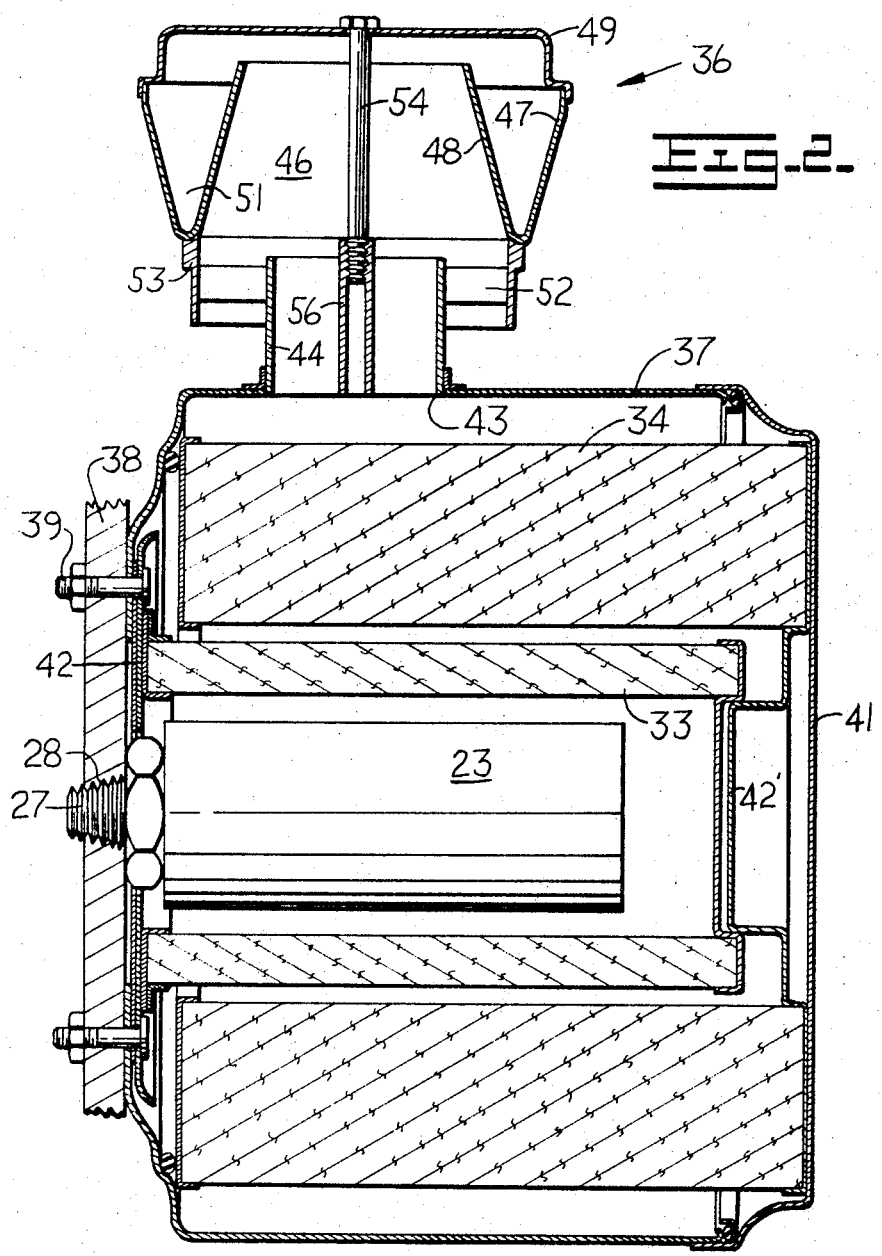

United States Patent Office 3,452,519
Patented July 1, 1969

3,452,519
PRESSURE STABILIZING VENT SYSTEM FOR HYDRAULIC CIRCUIT FLUID RESERVOIRS
Donald L. Bianchetta, Coal City, Ill., assignor to Caterpillar Tractor Co., Peoria, Ill., a corporation of California
Filed Feb. 6, 1967, Ser. No. 614,084
Int. Cl. B01d 46/12, 45/12, 29/04
U.S. Cl. 55—323                                    3 Claims

ABSTRACT OF THE DISCLOSURE

A vent valve avoids excessively high or low hydraulic fluid reservoir pressures from the influx or withdrawal of fluids by opening when the pressure departs from atmospheric pressure by a predetermined amount. To avoid contamination of the fluid by dust or the like, the valve is communicated with the reservoir through an air vessel thereby reducing the frequency of valve opening and is communicated with the atmosphere through a multiple filter and air cleaner arrangement.

Background of the invention

This invention relates to hydraulic circuit components and more particularly to vent constructions for admitting and emitting air at hydraulic fluid reservoirs to avoid large pressure fluctuations therein.

Many diverse forms of hydraulic circuit include a reservoir vessel for containing the portion of the hydraulic fluid which is not being utilized, at any particular time, in other elements of the circuit. In many such systems, large quantities of fluid may be withdrawn or returned to the reservoir at various times. This situation occurs, for example, in the control circuitry for the hydraulic jacks which are used to power various mechanisms on dump trucks, tractors, and other vehicles. In a high capacity dump truck a very large hoist jack may be needed to lift the truck body for dumping. As it is not usually convenient to provide overly large fluid reservoirs on such vehicles, operation of the jacks may withdraw a major portion of the fluid from the reservoir and upon retraction of the jacks an equally sizable inflow will occur.

The forced withdrawal of a large quantity of fluid from a closed vessel will produce a very substantial pressure drop therein and similarly the forced admission of fluid into the vessel creates a pressure rise. While most hydraulic circuits can tolerate a certain limited amount of pressure fluctuation in the fluid reservoir, excessive variations from atmospheric pressure may create unstable conditions and interfere with the proper functioning of the system. To avoid these problems it has been a common practice to provide a breather vent at the fluid reservoir so that air may enter or escape as needed to maintain the reservoir at atmospheric pressure or reasonably close thereto.

Venting of the reservoir in this manner gives rise to a further problem in that dust and other foreign material tends to enter the hydraulic system. Such contamination may clog and sometimes damage components of the circuit. To reduce contamination, prior vent systems have sometimes included a valve which remains closed and effectively seals the system except at such times as pressure in the reservoir deviates from atmospheric pressure by some predetermined amount. This avoids a more continual movement of air into and out of the reservoir through the vent inasmuch as many of the pressure fluctuations therein are not of sufficient magnitude to cause any operating difficulties in the circuit. A filter has also been employed at the vent for this purpose, with the filter generally being an internal component of the valve.

These prior provisions have been only partly effective and contamination of fluid systems through the breathing vent has remained a serious problem and one which is aggravated by the current tendency to employ very large, high capacity fluid operated mechanisms on many forms of equipment.

Summary of the invention

The present invention provides for venting a hydraulic fluid reservoir to reduce pressure fluctuations therein while maintaining a much more effective filtering action. By reducing contamination of the hydraulic fluid from dust and other foreign material, maintenance is simplified, the possibility of damage to circuit components is reduced and the reliability of the hydraulic system is greatly increased.

The invention utilizes the conventional valve of the class which remains closed while the reservoir pressure is within a predetermined range which generally includes atmospheric pressure. Thus the reservoir remains sealed for much of the time during minor pressure fluctuations which are not extensive enough to interfere with the circuit operation. Unlike the prior devices, the valve is not communicated directly with the reservoir but vents a secondary vessel which is in turn communicated with the reservoir. This construction decreases the possibility of contamination by increasing the proportion of the time the vent remains closed inasmuch as the large air volume in the secondary vessel has the effect of reducing the magnitude of pressure fluctuations which might otherwise exceed the range at which the valve remains closed. In addition, the secondary vessel and valve may readily be situated remote from the reservoir. Thus no complication or enlargement of the reservoir itself, which might be difficult because of space restrictions, is required.

While the valve of the present invention may contain the usual filter as an internal element, further filtering action is obtained with additional filters. In a preferred form, the filters are cylindrical and disposed in a coaxial radially spaced arrangement with the vent valve within the innermost filters. The cylindrical filters are in turn enclosed by a housing which communicates with the atmosphere through a centrifugal air cleaner. This arrangement provides for a maximum filter volume at the outermost cylindrical filter which receives the most contamination and the porous filters are themselves protected from much gross contamination, which would necessitate frequent filter replacement, in that incoming air is subjected to a centrifugal cleaning action before it reaches the filters.

Accordingly it is an object of this invention to provide for greater reliability, reduced wear and damage, and lessened maintenance in the operation of hydraulic powered systems.

It is another object of the invention to provide for the venting of hydraulic fluid reservoirs with minimized risk of contamination and without requiring complications or enlargement of the reservoir.

It is still another object of the invention to provide for a much more effective filtering of air admitted to hydraulic circuit systems for the purpose of stabilizing pressure therein.

The invention, together with further objects and advantages thereof, will best be understood by reference to the following description of a specific embodiment and to the accompanying drawings.

Brief description of the drawings

In the accompanying drawings, FIGURE 1 is an elevation view of a vent construction for a hydraulic fluid reservoir in accordance with the invention with certain hydraulic circuit components shown schematically;

FIGURE 2 is an elevation section view of the filter housing and associated components of the apparatus shown in FIGURE 1; and FIGURE 3 is a schematic diagram of the reservoir, vent and hydraulic circuit elements of FIGURE 1.

Description of a preferred embodiment

Referring now to FIGURE 1 of the drawing, many different varieties of hydraulic circuit have a reservoir 11 for storing the hydraulic fluid 12, which is typically oil, that is not being employed in other portions of the circuit at any given time. Fluid 12 is withdrawn from reservoir 11, when needed, by a pump 13 at an outlet conduit 14 and may be returned to the reservoir through a second conduit 16. This withdrawal and subsequent replenishing of the fluid supply in reservoir 11 may occur, for example, in a circuit used for operating one or more hydraulic jacks. It is frequently not convenient, and is sometimes wholly impractical to utilize a reservoir 11 having a volume much greater than that of the maximum amount of fluid 12 which may be withdrawn at times. Under this condition, extreme pressure fluctuations will occur in the reservoir 11 if some form of pressure stabilizing means is not provided. The pressure will rise as fluid is admitted to the reservoir 11 through conduit 16 and will drop as the fluid is withdrawn through conduit 14. As pressure fluctuations beyond a certain limited range may interfere with the operation of the hydraulic circuit, a venting assembly 17 is communicated with the upper region of the reservoir 11 through a vent conduit 18.

The venting assembly 17 may readily be situated at a remote location from the reservoir 11 as is frequently desirable because of space limitations in the region of the reservoir. In some instances this may also provide for locating the vent where there is less dust and other potential contamination.

Considering now the structure of the venting assembly 17, conduit 18 communicates with a secondary air vessel 19 which in effect provides for an enlarged air volume above the fluid 12 in reservoir 11 without enlarging or complicating the reservoir itself. Vessel 19 may be provided with a normally closed drain valve 21 to bleed off condensed moisture, oil or other substances which may accumulate in the interior chamber 22 of the vessel.

Vessel 19 is vented to the atmosphere through a pressure stabilizing valve 23 contained in a filter housing 24 which is in turn vented through a centrifugal air cleaner 26. Referring now to FIGURE 2 in particular, valve 23 has a cylindrical configuration and has a threaded fitting 27 projecting from one end and engaged in a threaded bore 28 in the adjacent wall of air vessel 19. In addition to providing for the passage of air between valve 23 and vessel 19, fitting 27 supports the valve thereon. Valve 23 may be of a known type which is normally closed and which opens when the pressure at fitting 27 exceeds atmospheric pressure by a predetermined amount and which also opens when the pressure at the fitting drops below atmospheric pressure a predetermined amount. As shown schematically in FIGURE 3, such a valve 23 is in effect comprised of a pressure relief valve 29 connected in parallel with a vacuum relief valve 31 with each being appropriately biased to block passage between the two ports 30 and 35 of the valve except when the pressure differential at opposite ends thereof exceeds the predetermined values. Suitable detailed structure for a valve of this general type is disclosed in U.S. Patent No. 3,112,763 issued Dec. 3, 1963 and entitled "Combined High Pressure Relief and Void Control Valve."

Valves of this general type are frequently provided with an internal porous filter 32 to protect the system from contamination by dust and the like. As hereinbefore discussed such a valve, including the filter 32 does not provide a completely effective filtering action. Accordingly the present invention utilizes two additional porous filters 33 and 34 together with a centrifugal air cleaner 36 all situated in the flow passage to the stabilizing valve 23. Referring now again to FIGURE 2, a unique physical arrangement of the filter elements 33, 34 and 36 is employed to maximize the filtering action and to reduce maintenance.

A cylindrical filter housing 37 is secured to the sidewall 38 of vessel 19 by bolts 39 in coaxial relationship with the stabilizing valve 23. Filter housing 37, which is of substantially greater diameter than the valve 23 and is of greater length, has a removable circular closure 41 at the end remote from the vessel wall 38. A first of the porous filters 33 is of cylindrical configuration and is held within housing 37 in coaxial relationship to the stabilizing valve 23 by internal supporting structure 42 and 42'. The second of the porous filters 34 is also of cylindrical configuration but is of greater diameter than filter 33 and is thicker in the radial direction. The second or outermost filter 34 is disposed coaxially with respect to both the valve 23 and inner filter 33. The several elements are proportioned so that the inner filter 33 is radially spaced from the valve 23 and the outermost filter 34 is radially spaced from both filter 33 and the outer wall of housing 37 thereby providing for the circulation of air around the surfaces of each filter at each side thereof. Both filters 33 and 34 extend for the full distance between the supporting structure 42 at one end of the housing 37 and the supporting structure 42' at the opposite end thereof so that air flow to and from the valve 23 must necessarily pass through both filters.

The centrifugal air cleaner 36 is mounted at the top of filter housing 37 at an opening 43 therein. A short cylindrical base tubulation 44 extends upward from opening 43 into the base of an annular vortex housing 46. Housing 46 has an outer wall 47 which turns inward and upward at the base and is thereby continuous with a reentrant inner wall 48 which is of progressively narrowing diameter upward from the base tubulation 44. A dished circular top cover 49 fits against the upper rim of outer wall 47 and is spaced from the upper rim of the reentrant inner wall 48 to provide for the passage of dust into a collection pocket 51 formed between the inner and outer wall sections 47 and 48. Inclined vanes 52 extend between the base tubulation 44 and an annular skirt 53 which extends downward from housing 46 in coaxial relationship to the base tubulation 44. Cap 49 is held in place by a bolt 54 which extends along the axis of the air cleaner and engages a threaded sleeve 56 secured to the base tubulation 44 in coaxial relationship therewith.

At such times as air is passing into the filter housing 37 through housing 46, a circulatory motion is imparted to the flow by the inclined vanes 52. As the air moves angularly within the housing 46, relatively heavy particulate matter therein is thrown upwardly and outwardly into pocket 51 by centrifugal force. Thus the air is partially cleaned at the time at which it enters the filter housing 37.

In operation, with reference to FIGURES 2 and 3 in conjunction, the stabilizing valve 23 normally seals the interior of reservoir 11 from the external atmosphere. The biasing of pressure relief valve 29 and vacuum relief valve 31 are set so that this sealing of the reservoir 11 is maintained irrespective of minor pressure fluctuations therein such as may sometimes occur, for example, from braking and steering operations where the hydraulic system is associated with a vehicle. In a typical system pressure relief valve 29 might be biased to open at a pressure of 10 p.s.i. and the vacuum release valve 31 might be set to open at 0.3 p.s.i. If the pressure in reservoir 11 exceeds these limits, or such other preset limits as may be appropriate to the particular system, one or the other of the valves 31 and 29 opens to communicate the reservoir with the atmosphere through the filter housing 37 and precleaner 36 to emit or admit air and thereby restore the reservoir pressure to a value within the predetermined range. It will be observed that one effect of the secondary air vessel 19 is to reduce the frequency of such opening of the stabilizing valve 23 inasmuch as the added air volume provided by the vessel 19 has the effect of reducing the amplitude of pressure fluctuations within the reservoir 11. Thus some fluctuations which might otherwise open the stabilizing valve 23 are reduced to a magnitude within the range of tolerated pressures.

Contamination is prevented from entering the system at such time as stabilizing valve 23 is open to admit air inasmuch as such air must pass through each of the filters 32, 33 and 34 as well as the precleaner 36. Much of the contamination and particularly the heavier component thereof is removed from the incoming air by the precleaner 36. The air then passes from precleaner 36 into the filter housing 37 where it must first pass through the outermost and largest of the porous filters, specifically filter 34. The air may redistribute itself annularly in passing from outer filter 34 to inner filter 33 in view of the spacing therebetween and after passage through the inner filter enters the stabilizing valve 23 where additional air cleaning is effected by the internal filter 32.

The combined effect of the several filtering operations together with the reduced frequency of opening of valve 23 is that significant contamination of the fluid 12 within reservoir 11 is avoided. The cylindrical filters 33 and 34 may readily be replaced when necessary. Such replacement of the filters 34 as well as other maintenance operations, such as the bleeding of vessel 19 through drain 21, may be greatly facilitated in that venting assembly 17 can be located at a readily accessible position remote from that of reservoir 11 if necessary.

I claim:

1. In combination with a hydraulic fluid reservoir a vent construction comprising a filter housing, at least one porous filter disposed in said housing, a centrifugal air cleaner coupled to said housing, an air vessel communicated with said reservoir, and a valve defining an air flow passage from said vessel to said filter housing, said valve being of the class which is normally closed and which opens in response to a pressure which differs from atmospheric pressure by a predetermined amount.

2. The combination defined in claim 1 wherein said filter housing is cylindrical and is attached at one end to said air vessel and wherein said valve is disposed within said housing, said housing and vessel and valve being situated at a location remote from said reservoir and being communicated therewith through an air conduit, and wherein a plurality of said filters are disposed in said housing, said filters being cylindrical and being disposed in a coaxial radially spaced relationship within said housing.

3. In combination with a hydraulic fluid reservoir of the class having means for withdrawing fluid therefrom and for returning said fluid thereto, a vent construction comprising a vessel situated remote from said reservoir and having an air chamber communicated therewith through a vent conduit; a filter housing having an end adjacent to said air vessel and having a first opening thereat and a second opening spaced radially from said first opening, means fastening said housing to said vessel; a plurality of coaxial, cylindrical, radially spaced, replaceable porous filters disposed in said housing; a centrifugal air cleaner communicated with the region of said housing radially outward from said filters through said second opening of said housing; means supporting said filters in said housing and limiting air flow between said first and second openings thereof to a path which includes each of said filters; a valve disposed in said housing radially inward from said filters, said valve having a port communicated with said reservoir through said air vessel and said first opening of said housing and a second port communicating with said region of said housing radially inward from said filters and being of the class which is normally closed and which opens in response to a predetermined pressure differential between said ports thereof and being of the class having an internal filter; and means supporting said valve in said position within said housing.

References Cited

UNITED STATES PATENTS

| | | | |
|---|---|---|---|
| 1,973,258 | 9/1934 | Jensen | 55—417 X |
| 2,046,093 | 6/1936 | Schaaf et al. | 55—323 X |
| 2,092,925 | 9/1937 | Lithgow | 55—309 |
| 2,220,328 | 11/1940 | Grothe. | |
| 2,404,468 | 7/1946 | Vokes et al. | 55—418 X |
| 2,496,883 | 2/1950 | McKalip. | |
| 2,532,888 | 12/1950 | Brown | 55—420 |
| 2,566,463 | 9/1950 | Orban | 55—482 X |
| 2,703,153 | 3/1955 | Revoir et al. | 55—420 X |
| 2,790,578 | 4/1957 | Moeller et al. | 55—418 X |
| 2,850,877 | 9/1958 | Slomer | 55—256 X |
| 2,894,530 | 7/1959 | Stevens et al. | 55—310 |
| 2,973,830 | 3/1961 | Gruner | 55—337 |
| 3,012,631 | 12/1961 | Kaser | 55—323 |
| 3,186,391 | 6/1965 | Kennedy | 55—482 X |

FOREIGN PATENTS

| | | |
|---|---|---|
| 882,647 | 11/1961 | Great Britain. |
| 904,007 | 2/1954 | Germany. |
| 761,710 | 11/1956 | Great Britain. |
| 1,349,759 | 12/1963 | France. |
| 1,237,198 | 6/1960 | France. |

HARRY B. THORNTON, *Primary Examiner.*

DENNIS E. TALBERT, JR., *Assistant Examiner.*

U.S. Cl. X.R.

55—330, 337, 417, 420, 449, 457, 482, 510; 60—52; 137—544; 220—85